United States Patent
Li et al.

(10) Patent No.: US 12,542,001 B2
(45) Date of Patent: Feb. 3, 2026

(54) DISPLAY DEVICE AND FINGERPRINT IDENTIFICATION METHOD

(71) Applicant: HKC CORPORATION LIMITED, Shenzhen (CN)

(72) Inventors: Yao Li, Shenzhen (CN); Zhonglin Cao, Shenzhen (CN); Chuan Wu, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/759,491

(22) Filed: Jun. 28, 2024

(65) Prior Publication Data

US 2025/0005968 A1    Jan. 2, 2025

(30) Foreign Application Priority Data

Jun. 28, 2023   (CN) .......................... 202310781771.8

(51) Int. Cl.
| | |
|---|---|
| *G06F 3/041* | (2006.01) |
| *G06V 40/13* | (2022.01) |
| *G06V 40/60* | (2022.01) |
| *H10K 59/90* | (2023.01) |

(52) U.S. Cl.
CPC .......... *G06V 40/60* (2022.01); *G06V 40/1306* (2022.01); *H10K 59/90* (2023.02)

(58) Field of Classification Search
CPC .... G06V 40/60; G06V 40/1306; H10K 59/90; G06F 3/04144
See application file for complete search history.

(56) References Cited

U.S. PATENT DOCUMENTS

| | | | |
|---|---|---|---|
| 2017/0270339 A1 | 9/2017 | Zou | |
| 2021/0027034 A1* | 1/2021 | Sun | ..................... G06F 3/04144 |
| 2023/0020296 A1* | 1/2023 | Zhang | ................ G06V 40/1306 |

FOREIGN PATENT DOCUMENTS

| | | | |
|---|---|---|---|
| CN | 105844233 | A | 8/2016 |
| CN | 109598181 | A | 4/2019 |
| CN | 109917952 | A | 6/2019 |
| CN | 111443825 | A | 7/2020 |
| CN | 111626214 | A | 9/2020 |
| CN | 111709394 | A | 9/2020 |
| CN | 111832523 | A | 10/2020 |
| CN | 112016541 | A | 12/2020 |
| CN | 113343800 | A | 9/2021 |
| CN | 114648783 | A | 6/2022 |
| CN | 217789700 | U | 11/2022 |
| KR | 20110095565 | A | 8/2011 |
| WO | 2018196699 | A1 | 11/2018 |

\* cited by examiner

*Primary Examiner* — Abdul-Samad A Adediran
(74) *Attorney, Agent, or Firm* — Franklin & Associates International Inc; Matthew F. Lambrinos

(57) ABSTRACT

The disclosure relates to a display device and a fingerprint identification method. The display device includes: a finger detection module, a fingerprint identification module and a displacement mechanism, in which the finger detection module is configured to detect a position of a finger; the fingerprint identification module is configured to detect identification information of the finger; the displacement mechanism includes a power structure and a driven structure connected to each other, the fingerprint identification module is fixedly mounted on the driven structure, and the driven structure can drive the fingerprint identification module to move to an identification position of the finger.

15 Claims, 5 Drawing Sheets

DISPLAY DEVICE AND FINGERPRINT IDENTIFICATION METHOD

CROSS-REFERENCE TO RELATED APPLICATIONS

The present disclosure claims all benefits of Chinese patent application No. 202310781771.8 filed on Jun. 28, 2023 before the China National Intellectual Property Administration of the People's Republic of China, entitled "Display Device and Fingerprint Identification Method", which is incorporated herein by reference in its entirety.

FIELD

The present disclosure relates to the technical field of display panels, particularly to a display device and a fingerprint identification method.

BACKGROUND

With the development of science and technology, a variety of applications of biometric technology have appeared on electronic devices such as mobile phones. With the popularization of full screen, biometric technologies commonly used on electronic devices include under-screen fingerprint identification and face image identification. Both have their own advantages and disadvantages and belong to identification applications different biological features.

There are two existing fingerprint identification methods. One is a fixedly set fingerprint identification device: a user can only be identified in fingerprint in the same area, and for different users, this identification method has a poor experience. The other is to add a plurality of fingerprint identification areas and arrange fingerprint identification devices respectively to realize fingerprint identification in a plurality of areas. In this way, the fingerprint identification area is relatively large, identification accuracy is low, increases in weight and energy consumption of the electronic device are relatively high, and use costs are relatively high.

SUMMARY

The disclosure provides a display device and a fingerprint identification method to solve the problem in the related art that an identification position of an under-screen fingerprint is fixed and fingerprint identification experience of a user is poor.

In a first aspect, the present disclosure provides a display device, comprising: a finger detection module, a fingerprint identification module and a displacement mechanism, wherein the finger detection module is configured to detect a position of a finger; the fingerprint identification module is configured to detect identification information of the finger; the displacement mechanism comprises a power structure and a driven structure connected to each other, the fingerprint identification module is fixedly mounted on the driven structure, and the driven structure can drive the fingerprint identification module to move to an identification position of the finger.

In a second aspect, the present disclosure provides a fingerprint identification method, comprising: detecting position information of the finger by the finger detection module when the finger touches the finger detection module and sending the position information to the control center; analyzing the position information of the finger and comparing the same with position information of the fingerprint identification module by the control center; calculating an operation path of the fingerprint identification module and moving the fingerprint identification module to the identification position of the finger through the power structure and the driven structure of the displacement mechanism; enabling the fingerprint identification module to collect the identification information of the finger; and performing functional output according to the identification information of the finger by the control center.

According to the display device and the fingerprint identification method provided by the disclosure, the display device realizes movement of the fingerprint identification module through the displacement mechanism, thereby performing fingerprint identification of a user at various positions, which helps to increase a range and accuracy of fingerprint identification, and can also effectively decrease energy consumption of fingerprint identification. The disclosure effectively solves the problem in the related art that a fingerprint identification position of the display device is fixed and fingerprint identification experience of a user is poor.

BRIEF DESCRIPTION OF DRAWINGS

Features, advantages, and technical effects of exemplary embodiments of the present disclosure will be described below with reference to the accompanying drawings. In the drawings, the same components bear the same reference numerals. The drawings are not drawn to actual scale and are used merely to indicate relative positional relationships. Some parts are drawn exaggeratedly in layer thicknesses to facilitate understanding, and the layer thicknesses in the drawings do not represent actual layer thicknesses.

DESCRIPTION OF REFERENCE NUMERALS

Figure 1:
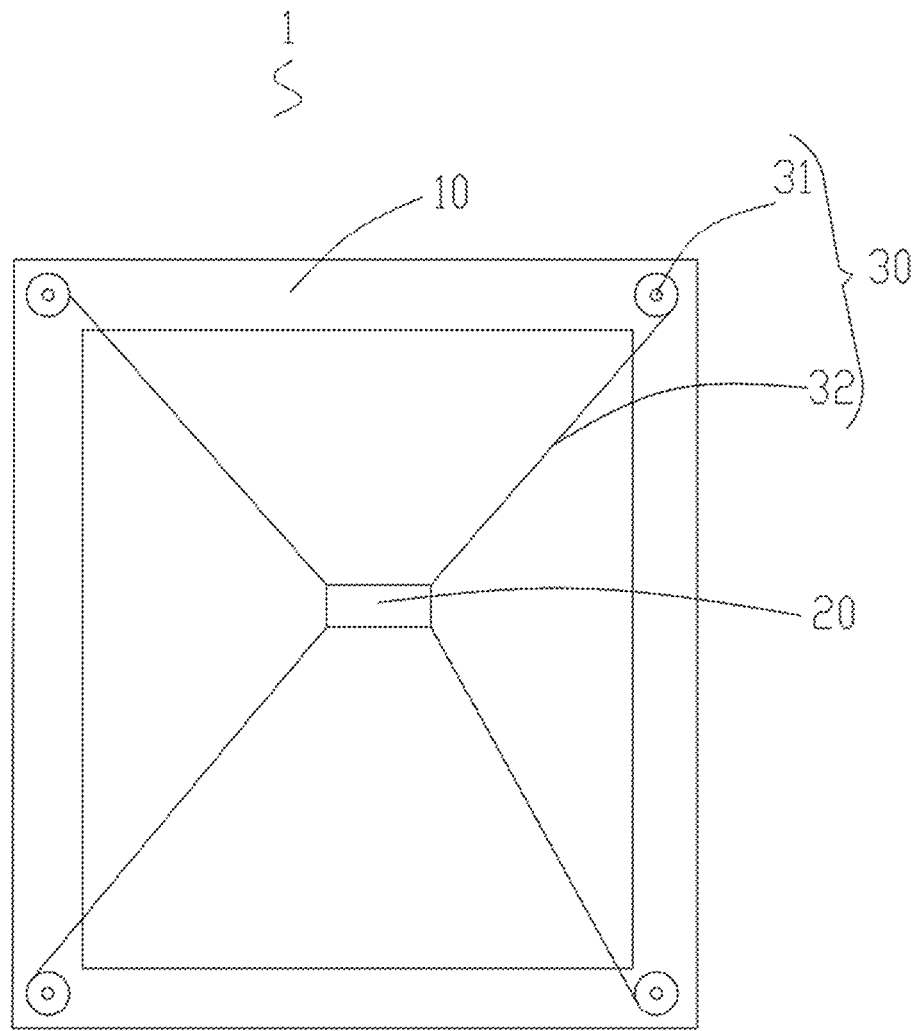
FIG. 1 is a schematic diagram of an internal structure of a display device according to Embodiment 1 of the present disclosure.

1. Display device;
10. Mounting frame;
20. Fingerprint identification module;
30. Displacement mechanism; 31. Power structure; 311. Rotary body; 312. Rotary shaft; 32. Driven structure; 321. Driving member;
40. Finger detection module.

DETAILED DESCRIPTION

In order to make objects, technical solutions, and advantages of embodiments of the disclosure clearer, the technical solutions in the embodiments of the disclosure will be clearly and fully described in combination with the accompanying drawings in the embodiments of the disclosure.

Obviously, the embodiments to be described are part of embodiments but not all embodiments of the disclosure. Based on the embodiments in the disclosure, all other embodiments obtained by those of ordinary skill in the art without inventive work shall fall within the scope of the disclosure.

Many different embodiments or examples are disclosed below to realize different structures of the disclosure. In order to simplify the disclosure, components and arrangements of specific examples are described below. Of course, they are only examples and are not intended to limit the disclosure. Furthermore, the present disclosure may repeat reference numerals and/or letters in different examples. The repetition is for simplicity and clarity, and in itself does not indicate the relationship between the various embodiments and/or arrangements discussed.

For the convenience of description, spatial relationship terms can be used herein to describe the relative positional relationship or movement of one element or feature relative to another element or feature as shown in the drawings, such as "inside", "outside", "inner", "outer", "under", "below", "on", "above", "front" and "back". This spatial relationship term is intended to include different orientations of the device in use or operation other than orientations depicted in the drawings. For example, if the device in the drawings has a position turnover, a posture change or a movement state change, these directional indications will change accordingly, for example: Elements described as "under or below other elements or features" will be subsequently oriented as "on or over other elements or features". Thus, the exemplary term "below" may include both orientations of above and below. The device may be otherwise oriented (rotated by 90 degrees or in other directions), and the spatial relationship terms used herein are interpreted accordingly.

Embodiment 1

Figure 2:
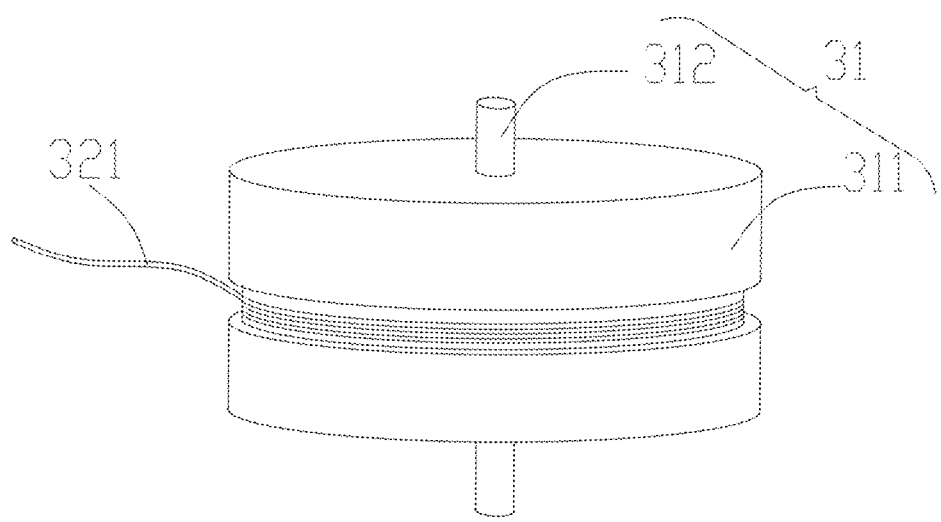
FIG. 2 shows a schematic assembly diagram of a driving member and a power structure of the display device in FIG. 1.
Figure 3:
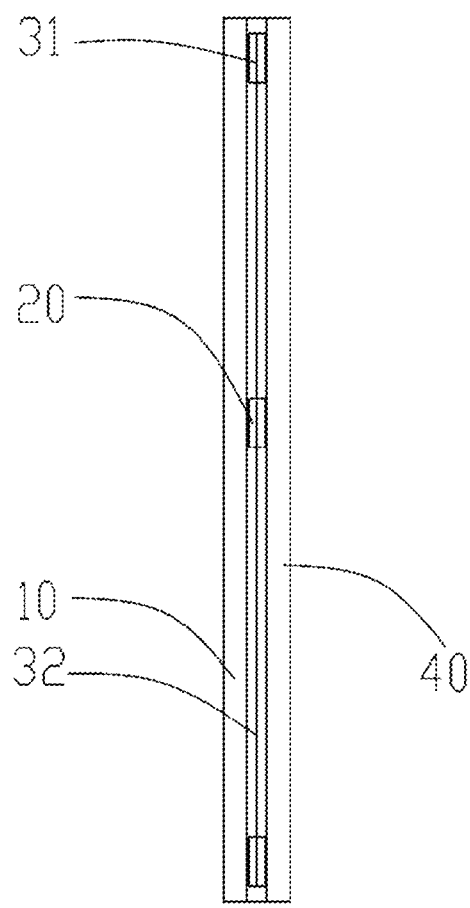
FIG. 3 is a side view of the display device according to Embodiment 1 of the present disclosure.

As shown in FIGS. 1 to 3, Embodiment 1 of the present disclosure provides a display device comprising: a finger detection module 40, a fingerprint identification module 20 and a displacement mechanism 30, wherein the finger detection module 40 is configured to detect a position of a finger; the fingerprint identification module 20 is configured to detect identification information of the finger; the displacement mechanism 30 comprises a power structure 31 and a driven structure 32 connected to each other, the fingerprint identification module 20 is fixedly mounted on the driven structure 32, and the driven structure 32 can drive the fingerprint identification module 20 to move to an identification position of the finger. Movement of the fingerprint identification module 20 is realized through the displacement mechanism 30, thereby performing fingerprint identification of a user at various positions, which helps to increase a range and accuracy of fingerprint identification, and can also effectively decrease energy consumption of fingerprint identification. The disclosure effectively solves the problem in the related art that a fingerprint identification position of the display device is fixed and fingerprint identification experience of a user is poor.

As shown in FIG. 1, in the technical solution of Embodiment 1, the driven structure 32 comprises a plurality of driving members 321 which are connected to different output ends of the power structure 31 respectively and connected to the fingerprint identification module 20 separately. A plurality of the driving members 321 are configured to transfer the fingerprint identification module 20 from a plurality of positions, which effectively decomposes transfer action of the fingerprint identification module 20, converting a complex movement into a plurality of simple movements, and a plurality of the driving members 321 can move simultaneously, which reduces operation time of the fingerprint identification module 20 and improves efficiency of fingerprint identification.

Further, in the technical solution of Embodiment 1, the display device further comprises a mounting frame 10, the fingerprint identification module 20 is provided in the mounting frame 10, there are four driving members 321, and the power structure 31 has four output ends respectively arranged at four corners of the mounting frame 10. The four driving members 321 can decompose an operation direction of the fingerprint identification module 20, which can reduce a span of the driving members 321, provide reliable and accurate operation, and avoid deformation of the driving member 321 due to a weight of the fingerprint identification module 20 itself and internal space limitation of the mounting frame 10 in the case of long distances, thereby affecting identification accuracy of the fingerprint identification module 20.

It should be noted that the mounting frame 10 is generally cuboid, thickness of the fingerprint identification module 20 is slightly smaller than that of the mounting frame 10, and the fingerprint identification module 20 performs plane displacement within the frame of the mounting frame 10. This ensures that the displacement of the fingerprint identification module 20 will not affect other components, and other components will not interfere with the fingerprint identification module 20, ensuring reliability of transfer of the fingerprint identification module 20 and the identification accuracy of the identification module 20. Compared with the fixed fingerprint identification module in the related art, the movable fingerprint identification module 20 can be accurately positioned according to an actual pressing position of a user and can fully adapt to a fingerprint detection area, and the accuracy of fingerprint identification is higher and the effect is more obvious; compared with a fingerprint identification module with a large fingerprint identification range, the disclosure can simplify the volume of the fingerprint identification module 20 and the fingerprint detection area, which can reduce power of the fingerprint identification module 20, and reduce overall power of the electronic device while ensuring the identification accuracy. The finger detection module 40 may be a touch screen mounted on the mounting frame 10.

Furthermore, the fingerprint identification module 20 is provided in the mounting frame 10, and the fingerprint identification module 20 and the mounting frame 10 are fit in clearance along the thickness direction of the mounting frame 10, which provides conditions of movement of the fingerprint identification module 20. A compact structure thereof is more conducive to the displacement of the fingerprint identification module 20 on a plane. The displacement is more accurate and will not cause a risk of scratching the interior of the display device 1.

As shown in FIG. 2, in the technical solution of Embodiment 1, the power structure 31 comprises a rotary body 311 which is rotatably connected to the mounting frame 10, and the driving member 321 is fixedly connected to a rotary surface of the rotary body 311. The rotary body 311 is configured to drive the driving member 321 to be displaced and can be driven with a micro motor commonly used in an electronic device, thereby realizing mutual displacement of the driving member 321 through rotation. The rotary body 311 can control a displacement distance by the motor, and cooperation between a plurality of the driving members 321 can be accurately controlled by controlling a rotation angle of the motor, thereby improving precise transportation of the fingerprint identification module 20. It should be noted that the rotary body 311 is provided with a groove through which the driving member 321 can be accommodated and guided. The rotary body 311 is provided with a rotary shaft 312 along an axial direction thereof, and the rotary shaft 312 is connected to the motor provided on the mounting frame 10.

As shown in FIG. 1, in the technical solution of Embodiment 1, the driving member 321 is a strip made of a flexible and/or tough material. The strip in cooperation with the rotary body 311 enables precise control of the fingerprint identification module 20 in a plurality of directions. The strip is easy to change direction and can fit the rotary body 311 according to different angles, which causes a force situation between the rotary body 311 and the strip to be essentially consistent. Although a force direction changes, the magnitude of the force is exactly equal, which makes the entire display device more stable in structure and more accurate in operation. The flexible and tough material also has high strength, which can adapt to requirements of precise displacement. It should be noted that different strips can also be made of different materials. In another embodiment, one of the strips is made of a material with high elasticity, and the other three strips are made of a material with low elasticity. By pulling the other three strips, the strip with high elasticity is deformed. An advantage of this is that the forces on the fingerprint identification module 20 are balanced with each other, making the operation more stable and reliable.

Further, in the technical solution of Embodiment 1, the strip is made of carbon nanofiber material. Carbon nanofiber is a fibrous nanocarbon material rolled up from a plurality of layers of graphite sheets which has a diameter of generally 10 nm to 500 nm and a length of 0.5 μm to 100 μm, and is a quasi-one-dimensional carbon material between carbon nanotubes and ordinary carbon fibers which has a high crystal orientation degree and good electrical and thermal conductivity. In addition to characteristics such as low density, high specific modulus, high specific strength, high conductivity and thermal stability of ordinary carbon fibers grown by chemical vapor deposition, the carbon nanofibers have advantages such as a low number of defects, a large L/D ratio, a large specific surface area and a compact structure, which is more suitable to be the driving member 321, has a long service life, high precision, and a weight lighter than other materials, and can lighten weight of an electronic device while ensuring effectiveness of its use.

It should be noted that in the technical solution of Embodiment 1, output ends of the power structures 31 are respectively arranged at four corners of the mounting frame 10, which enables the fingerprint identification module 20 to be displaced throughout the entire mounting frame 10. The four driving members 321 are all equal in size and length and equal in maximum displacement, which is more conducive to standardized production, and are arranged at the four corners where the mounting frame 10 has the highest structural strength and higher structural stability after assembly.

In the technical solution of Embodiment 1, the fingerprint identification module 20 uses ultrasonic under-screen fingerprint identification technology. Under-screen fingerprint identification technology in the related art is widely studied currently, and comprises capacitive fingerprint identification, under-screen optical fingerprint identification, ultrasonic fingerprint identification, and the like. Among them, ultrasonic under-screen fingerprint identification technology has the most accurate identification ability, and is based on ultrasonic waves, in which a sensor first emits ultrasonic waves to a surface of the finger and receives an echo, thereby constructing a 3D image for identification. The advantage of ultrasonic under-screen fingerprint identification lies in strong penetrability and high resistance to stains. Even wet and dirty fingers can still be perfectly identified. In addition, relying on excellent penetrability, ultrasonic waves support living body detection. Since a 3D fingerprint identification image can be obtained, security is higher than other under-screen fingerprint identification solutions.

On the basis of Embodiment 1, in some specific embodiments, a charging position is provided on the mounting frame 10, and an energy storage device is provided inside the fingerprint identification module 20, which can provide energy for the fingerprint identification module 20 for information collection in a period of time. The fingerprint identification module 20 has a default position when not enabled. The fingerprint identification modules 20 in the charging position and the default position cooperates with each other to achieve charging when not enabled, which can ensure that the fingerprint identification module 20 is reliable to use, and there will not be a problem that wires go wrong or wires interfere with the operation direction during operation since the wires are connected to the fingerprint identification module 20, resulting in a longer service life.

In the technical solution of the Embodiment 1, the fingerprint identification area is a full-screen area, and an under-screen ultrasonic emission area is located under the identification area and needs to be larger than the identification area. In the under-screen ultrasonic emission area, the design of four corners allows the driving member 321 to fix a position of an ultrasonic sensor. When a finger touches any position in the area, the four driving members 321 change their respective telescopic amounts to move the sensor to the finger position for identification. The disclosure is applied to the field of under-screen fingerprint identification and can effectively expand an identification area, thereby improving accuracy of under-screen fingerprint identification.

Embodiment 2

Figure 4:
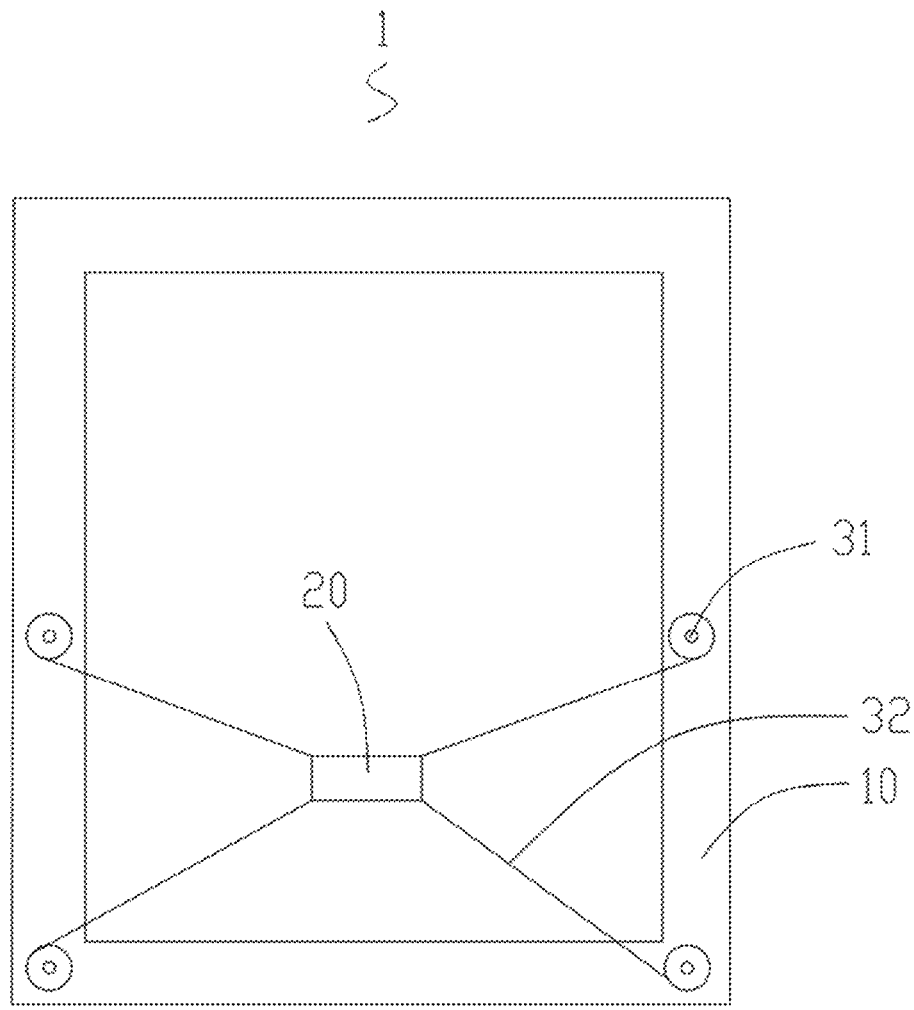
FIG. 4 is a schematic diagram of an internal structure of a display device according to Embodiment 2 of the present disclosure.
Figure 5:
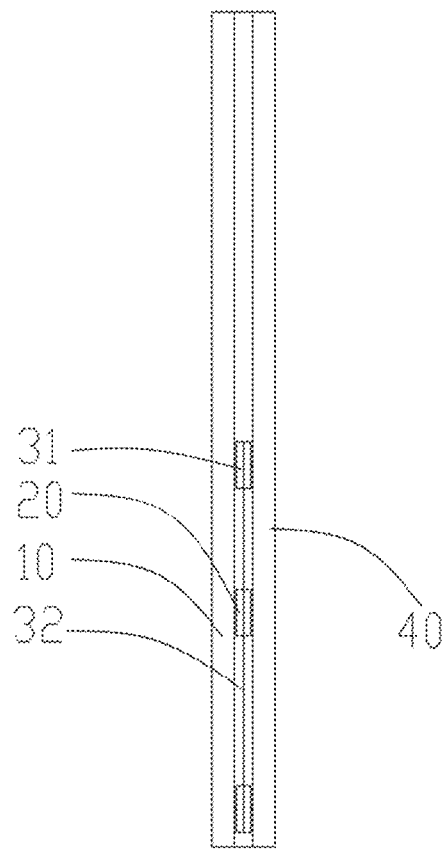
FIG. 5 is a side view of the display device according to Embodiment 2 of the present disclosure.

As shown in FIGS. 4 and 5, Embodiment 2 of the present disclosure provides a display device. A difference between Embodiment 2 and Embodiment 1 is that two of the output ends of the power structures 31 are arranged at the bottom of the mounting frame 10, and the other two are arranged in a middle position of the longer mounting arm of the mounting frame 10, which limits an operation range of the fingerprint identification module 20, and is for fingerprint identification in part of areas. It can be imagined that during the use of a smart phone, an area touched by the finger is mostly a lower area of a phone screen. In this case, setting the fingerprint identification module 20 in an area where the finger usually touches can increase the identification accuracy of the fingerprint identification module 20. Since a displacement amount is small, the accuracy is more controllable. Moreover, this can reduce an overall length of the driving member 321, thereby reducing a volume occupied by the driving member 321, making the structure more compact and the fingerprint identification effect more stable. The output end of the power structure 31 can also reduce action of force generated by the long-distance driving member 321.

As shown in FIGS. 4 and 5, an on-screen fingerprint identification area is a partial area, and the under-screen ultrasonic emission area is located under the identification area and needs to be larger than the identification area. The power structures 31 set at two corners and the power structures 31 located in the middle of the mounting frame allows the driving member 321 to fix a position of an ultrasonic sensor. When a finger is placed anywhere in the area, four hinges change their respective telescopic amounts to move the sensor under the finger position for identification.

A further difference between Embodiment 2 and Embodiment 1 is that sizes of the fingerprint identification area and the ultrasonic emission area are different. A finger position identification function of the fingerprint identification area can be combined with a touch function of the screen itself. If the screen itself is Touch in-cell or Touch on-cell, the finger position can be identified by combining the touch function of the screen itself, and there is no need to additionally design a finger identification functional component. If the screen itself does not have the Touch function, a Touch functional component needs to be set according to the size of the fingerprint identification area of Embodiment 1 or Embodiment 2.

Embodiment 3

In the technical solution of Embodiment 3, the driven structure 32 comprises a plurality of interconnected driving members 321 which are connected to different output ends of the power structure 31 respectively, and the fingerprint identification module 20 is connected to one of the driving members 321. The driving members 321 cooperate with each other to displace the driving member 321 connected to the fingerprint identification module 20, which has higher cooperativity and can control the displacement of operation step by step. Compared with the solution of Embodiment 1, an operation position is calculated less.

Further, in the technical solution of the Embodiment 3, the driving member 321 is a guide rail, the fingerprint identification module 20 is slidably connected to the driving member 321 through a slider, and the adjacent driving members 321 are slidably connected to each other through a slider. Sliding of the fingerprint identification module 20 is realized using the guide rail and slider, whose operation accuracy is higher and more reliable, and requirements for assembly and manufacturing accuracy of the mounting frame 10 are higher.

Embodiment 4

Figure 6:
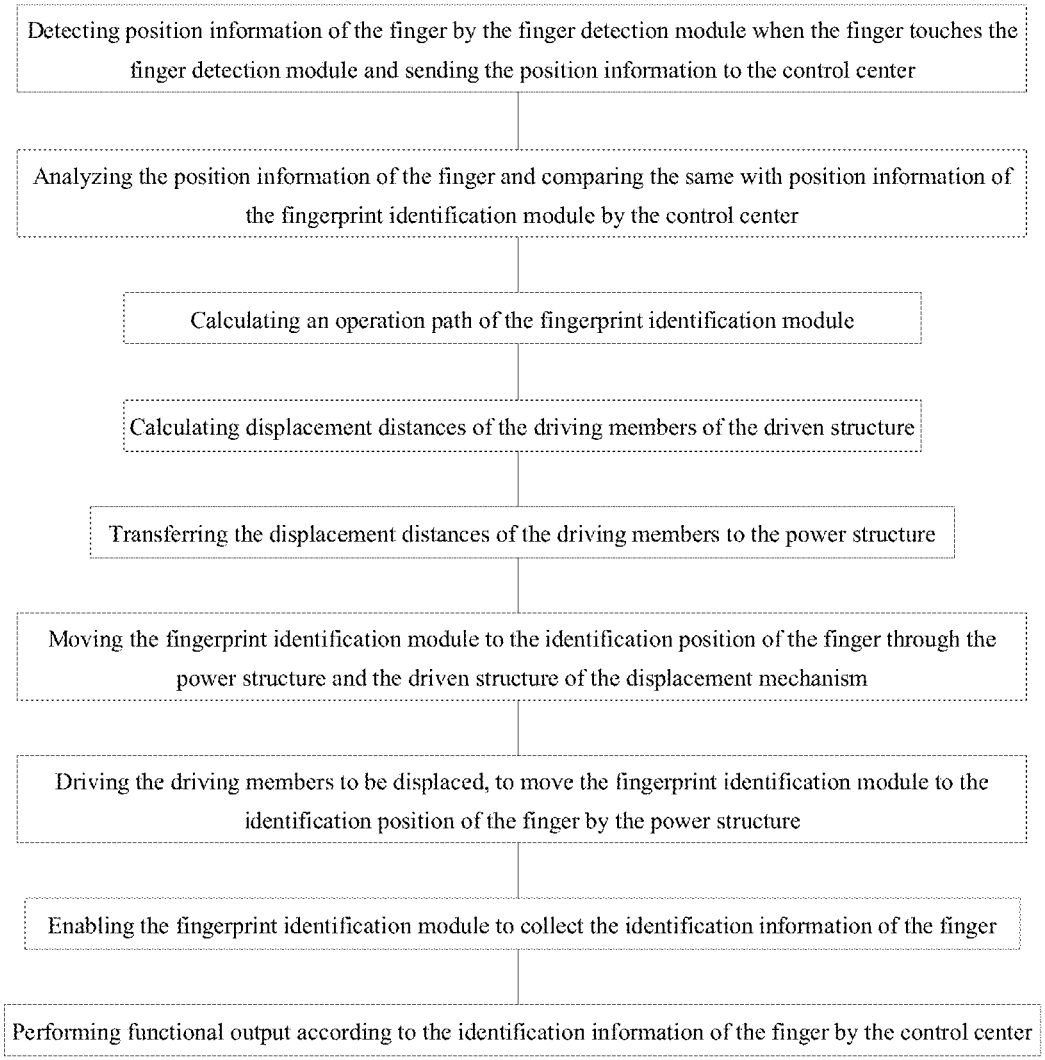
FIG. 6 shows a schematic flowchart of a fingerprint identification method according to Embodiment 4 of the present disclosure.

As shown in FIG. 6, Embodiment 4 of the present disclosure provides a fingerprint identification method which is applied to the display device of any one of Embodiments 1 to 3. The display device further comprises a control center. The fingerprint identification method comprises the following steps.

When a finger touches the finger detection module 40, the finger detection module 40 detects position information of the finger and sends the position information to the control center; the finger detection module 40 may be a touch module or a touch screen which can sense and identify a touch position, is electrically connected to the control center, and can transmit finger touch information to the control center.

The control center analyzes the finger position information and compares it with position information of the fingerprint identification module 20; the finger position information and the position information of the fingerprint identification module 20 are both plane coordinate information.

An operation path of the fingerprint identification module 20 is calculated, and the fingerprint identification module 20 is moved to a finger identification position through the power structure 31 and the driven structure 32 of the displacement mechanism 30; path analysis is performed by comparing coordinate information, and a displacement method is finally determined.

It should be noted that the position information of the finger and the position information of the fingerprint identification module 20 are within a region. When path analysis is performed, it is necessary to consider an overlap degree between a region where the fingerprint identification module 20 is located after displacement and a region where the finger is located. Only when the overlap degree reaches a certain degree can the fingerprint identification be performed or does the fingerprint identification have higher accuracy.

The fingerprint identification module 20 is enabled to collect finger identification information. The fingerprint identification module 20 collects the finger fingerprint information of the touch screen and transmits the collected fingerprint information to the control center; specifically, the fingerprint identification module 20 uses ultrasonic under-screen fingerprint identification technology to send out ultrasonic information and receive fingerprint information.

The control center performs functional output based on the collected fingerprint information, specifically comprising procedures such as payment, verification and unlocking.

As shown in FIG. 6, in the technical solution of the Embodiment 4, an operation path of the fingerprint identification module 20 is calculated, and the fingerprint identification module 20 is moved to a finger identification position through the power structure 31 and the driven structure 32 of the displacement mechanism 30, which comprises the following steps:

calculating a displacement distance of the driving member 321 of each of the driven structures 32; selecting a displacement distance and direction according to the position information of the finger and the position information of the fingerprint identification module 20, calculating a rotation amount of the rotary body 311 of the power structure 31 based on the displacement distance and direction, and comparing position information of the driving member 321 at an original position with position information after the displacement, so as to calculate a distance at which displacement is required. Based on Embodiment 1 and Embodiment 2, it is necessary to consider an angle and length relationship between the driving member 321 and the fingerprint identification module 20 before and after displacement, so as to adjust specific cooperation of the four driving members 321, thereby ensuring that the four driving members 321 can move stably when the fingerprint identification module 20 is held up.

The displacement distance of each driving member 321 is transferred to the power structure 31 specifically by signal transmission. Specifically, a common signal may be operation time, a rotation distance of the driving member 321, or the like.

The power structure 31 drive the driving member 321 to be displaced to move the fingerprint identification module 20 to the finger identification position; finally, the fingerprint identification module 20 is located under an area touched by the finger.

When a finger touches an electronic device, a Touch module of the electronic device will recognize a position of the finger and send the position to the control center. The control center will calculate an operation plan of the power structure 31 at four corners based on the finger position, and then move an ultrasonic sensor under the finger position. The ultrasonic sensor emits and receives ultrasonic waves, then performs the fingerprint identification function, and finally performs a reset function after the fingerprint identification is finished.

Furthermore, after the driving member 321 completes the movement, residence position information of the fingerprint identification module 20 may be collected, an error between preset position information and the final position information may be comprehensively judged, and error information and whether the error information has an impact on accuracy of the fingerprint identification may be recorded and simply debugged by the control center.

Embodiment 5

Embodiment 5 of the present disclosure provides an electronic device. The electronic device adopts the fingerprint identification method as in Embodiment 4. Such an electronic device can realize fingerprint identification at any point in a large area, and power consumption of the fingerprint identification module is almost the same as that of a traditional fingerprint identification module, which can not only perform large-scale fingerprint identification, but also meets the needs of power consumption, and has better user experience. The electronic device may be smartphones, mobile terminals, laptops, and the like. The fingerprint identification module is mainly used in full-screen mobile terminals. A display screen on the mobile terminal is also a touch component, and the fingerprint identification module is mounted under the touch component and can be adapted to the touch component to achieve an under-screen fingerprint unlocking function of a full screen at any position.

Specifically, the display screen of the mobile terminal may be an OLED display screen integrated with a touch module, and the fingerprint identification module is mounted on an OLED panel for fingerprint identification. The OLED display screen is made from organic self-luminous diodes. Without the need of a backlight, the display screen has a thickness thinner than that of a traditional display screen, and has advantages such as high contrast, a thin thickness, a wide viewing angle and fast response speed, and identification accuracy and response speed of a movable fingerprint identification module are fast, which is more conducive to user experience.

It should be understood that the terms used herein are only for the purpose of describing specific exemplary embodiments and are not intended to be limiting. Unless the context clearly indicates otherwise, the singular forms "a", "an" and "the" as used herein can also mean including plural forms. The terms "include", "including", "comprise" and "comprising" are inclusive and thus indicate the presence of features, steps, operations, elements and/or components described, but do not exclude the presence or addition of one or more other features, steps, operations, elements, components, and/or combinations thereof. The method steps, procedures, and operations described herein are not interpreted as necessarily requiring them to be executed in the specific order described, unless the execution order is explicitly indicated. It should also be understood that additional or alternative steps may be used.

Although a plurality of elements, components, regions, layers and/or sections can be described herein with the terms first, second, third, and the like, they should not be limited by these terms. These terms may be only configured to distinguish one element, component, region, layer or section from another ones. Terms such as "first" and "second" and other numerical terms do not imply sequence or order when used herein unless clearly indicated in the context. Accordingly, the first element, component, region, layer or section discussed below may be referred to as a second element, component, region, layer or section without departing from teachings of the exemplary embodiments.

The above is only description of embodiments of the present disclosure to enable those skilled in the art to understand or implement the present disclosure. Various modifications to these embodiments will be apparent to those skilled in the art, and general principles defined herein may be implemented in other embodiments without departing from the spirit or scope of the present disclosure. Thus, the present disclosure is not limited to the embodiments described herein, but shall conform to the widest scope consistent with the principles and novelty applied for herein.

What is claimed is:

1. A display device comprising:
   a finger detection module configured to detect an identification position of a finger;
   a fingerprint identification module configured to detect identification information of the finger; and
   a displacement mechanism comprising a power structure and a driven structure connected to each other, wherein the fingerprint identification module is fixedly mounted on the driven structure, and the driven structure is configured to drive the fingerprint identification module to move to the identification position of the finger.

2. The display device of claim 1, wherein the driven structure comprises a plurality of driving members which are connected to different output ends of the power structure respectively, and the fingerprint identification module is connected to the driving members separately.

3. The display device of claim 2, wherein the display device further comprises a mounting frame, the fingerprint identification module is provided in the mounting frame, the driven structure comprises four driving members, and the power structure has four output ends respectively arranged at four corners of the mounting frame.

4. The display device of claim 3, wherein the power structure comprises a rotary body which is rotatably connected to the mounting frame, and the driving member is fixedly connected to a rotary surface of the rotary body.

5. The display device of claim 4, wherein the driving member is a strip made of a flexible or tough material.

6. The display device of claim 5, wherein the strip is made of carbon nanofiber material.

7. The display device of claim 2, further comprising a mounting frame, wherein the fingerprint identification module is provided in the mounting frame, the driven structure comprises four driving members, and the power structure has four output ends, in which two of the output ends of the power structure are arranged at the bottom of the mounting frame, and the other two of the output ends of the power structure are arranged in a middle position of a longer mounting arm of the mounting frame.

8. The display device of claim 2, wherein the driven structure comprises a plurality of interconnected driving members which are connected to different output ends of the power structure respectively, and the fingerprint identification module is connected to one of the driving members.

9. The display device of claim 8, wherein the driving member is a guide rail, the fingerprint identification module is slidably connected to the driving member through a slider, and the adjacent driving members are slidably connected to each other through a slider.

10. The display device of claim 1, wherein the fingerprint identification module uses ultrasonic under-screen fingerprint identification technology.

11. A fingerprint identification method applied to a display device, the display device comprising: a finger detection module, a fingerprint identification module, a displacement mechanism and a control center, wherein the finger detection module is configured to detect a position of a finger; the fingerprint identification module is configured to detect identification information of the finger; the displacement mechanism comprises a power structure and a driven structure connected to each other, the fingerprint identification module is fixedly mounted on the driven structure, and the driven structure is configured to drive the fingerprint identification module to move to an identification position of the finger; and the fingerprint identification method comprising:
   detecting position information of the finger by the finger detection module when the finger touches the finger detection module and sending the position information to the control center;
   analyzing the position information of the finger and comparing the same with position information of the fingerprint identification module by the control center;
   calculating an operation path of the fingerprint identification module and moving the fingerprint identification module to the identification position of the finger through the power structure and the driven structure of the displacement mechanism;
   enabling the fingerprint identification module to collect the identification information of the finger; and
   performing functional output according to the identification information of the finger by the control center.

12. The fingerprint identification method of claim 11, wherein the driven structure comprises a plurality of driving members which are connected to different output ends of the power structure respectively and the fingerprint identification module separately, and calculating an operation path of the fingerprint identification module and moving the fingerprint identification module to the identification position of the finger through the power structure and the driven structure of the displacement mechanism comprises:
   calculating displacement distances of the driving members of the driven structure;
   transferring the displacement distances of the driving members to the power structure; and
   driving the driving members to be displaced to move the fingerprint identification module 20 to the identification position of the finger by the power structure.

13. The fingerprint identification method of claim 12, wherein the display device further comprises a mounting frame, the fingerprint identification module is provided in the mounting frame, the power structure comprises a rotary body which is rotatably connected to the mounting frame, the driving member is fixedly connected to a rotary surface of the rotary body, and calculating displacement distances of the driving members of the driven structure comprises:
   selecting a displacement distance and direction based on the position information of the finger and the position information of the fingerprint identification module, and
   calculating a rotation amount of the rotary body of the power structure based on the displacement distance and the displacement direction.

14. The fingerprint identification method of claim 13, wherein calculating a rotation amount of the rotary body of the power structure comprises:
   comparing position information of the driving member at an original position with position information after the displacement to calculate a distance at which displacement is required.

15. The fingerprint identification method of claim 11, wherein the fingerprint identification module uses ultrasonic under-screen fingerprint identification technology, and enabling the fingerprint identification module to collect the identification information of the finger comprises:
   sending out ultrasonic information and receiving the identification information of the finger by the fingerprint identification module.

\* \* \* \* \*